US 9,135,807 B2

United States Patent
Cirker (10) Patent No.: US 9,135,807 B2
(45) Date of Patent: *Sep. 15, 2015

(54) MOBILE WIRELESS DEVICE WITH LOCATION-DEPENDENT CAPABILITY

(76) Inventor: Seth Cirker, Port Washington, NY (US)

( * ) Notice: Subject to any disclaimer, the term of this patent is extended or adjusted under 35 U.S.C. 154(b) by 934 days.

This patent is subject to a terminal disclaimer.

(21) Appl. No.: 12/338,678

(22) Filed: Dec. 18, 2008

(65) Prior Publication Data

US 2009/0160673 A1 Jun. 25, 2009

Related U.S. Application Data

(63) Continuation-in-part of application No. 11/717,806, filed on Mar. 14, 2007, now Pat. No. 8,749,343.

(60) Provisional application No. 61/014,509, filed on Dec. 18, 2007.

(51) Int. Cl.
| | | |
|---|---|---|
| *G08B 25/10* | (2006.01) | |
| *G07C 9/00* | (2006.01) | |
| *G08B 13/196* | (2006.01) | |
| *H04W 4/02* | (2009.01) | |
| *H04L 29/08* | (2006.01) | |

(52) U.S. Cl.
CPC ............ *G08B 25/10* (2013.01); *G07C 9/00111* (2013.01); *G08B 13/19686* (2013.01); *G08B 13/19697* (2013.01); *H04L 67/18* (2013.01); *H04W 4/02* (2013.01); *G07C 2209/63* (2013.01)

(58) Field of Classification Search
USPC ................. 340/3.1, 3.3, 3.31, 3.32, 506, 511, 340/514–524, 539.13, 539.16–539.19, 340/539.22–539.25; 348/143–160
See application file for complete search history.

(56) References Cited

U.S. PATENT DOCUMENTS

| | | | |
|---|---|---|---|
| 4,283,132 A | 8/1981 | Engelsmann et al. | |
| 4,857,912 A * | 8/1989 | Everett et al. | ................. 340/508 |
| 5,455,561 A | 10/1995 | Brown | |
| 5,666,157 A | 9/1997 | Aviv | |

(Continued)

FOREIGN PATENT DOCUMENTS

| | | |
|---|---|---|
| DE | 20219004 U1 | 3/2003 |
| EP | 1244322 B2 | 6/2005 |

(Continued)

OTHER PUBLICATIONS

Supplementary European Search Report for European Patent Application No. EP08782751.5, dated Aug. 22, 2011.

*Primary Examiner* — Firmin Backer
*Assistant Examiner* — Nay Tun
(74) *Attorney, Agent, or Firm* — Holland & Hart LLP (57) ABSTRACT

A system for controlling a plurality of surveillance, monitoring and security devices within a prescribed area, including a mobile transmitter device configured to transmit a wireless signal to a remote device. Where the remote device controls the area-specific systems in response to the wireless signal. The devices able to be controlled depend on the location of the mobile transmitter device and information carried by the signal. Also, a method for controlling devices within prescribed areas of a building, including monitoring a location of a mobile transmitter device within the building, receiving a wireless signal from the mobile transmitter device, and controlling specific functions of the systems based on a location of the mobile transmitter device and the information carried by the transmitted signal.

7 Claims, 7 Drawing Sheets

(56) References Cited

U.S. PATENT DOCUMENTS

| | | |
|---|---|---|
| 6,696,957 B2 | 2/2004 | Shepher |
| 6,816,073 B2 | 11/2004 | Vaccaro |
| 6,917,293 B2 | 7/2005 | Beggs |
| 6,940,397 B1 | 9/2005 | Le Mire |
| 7,088,387 B1 | 8/2006 | Freeman et al. |
| 7,095,328 B1 * | 8/2006 | Stern et al. ............. 340/573.1 |
| 7,119,832 B2 | 10/2006 | Blanco et al. |
| 7,131,136 B2 | 10/2006 | Monroe |
| 7,187,279 B2 | 3/2007 | Chung |
| 7,280,030 B1 | 10/2007 | Monaco |
| 7,463,145 B2 | 12/2008 | Jentoft |
| 7,471,334 B1 | 12/2008 | Stenger |
| 7,735,116 B1 | 6/2010 | Gauvin et al. |
| 8,000,588 B1 | 8/2011 | Harvey |
| 8,123,419 B2 | 2/2012 | Cirker |
| 2001/0037509 A1 | 11/2001 | Kligman |
| 2002/0081110 A1 | 6/2002 | Johnson et al. |
| 2002/0125998 A1 | 9/2002 | Petite et al. |
| 2003/0053536 A1 | 3/2003 | Ebrami |
| 2003/0102967 A1 | 6/2003 | Kao |
| 2003/0210139 A1 | 11/2003 | Brooks |
| 2004/0003051 A1 | 1/2004 | Krzyzanowski et al. |
| 2004/0008253 A1 | 1/2004 | Monroe |
| 2004/0013192 A1 | 1/2004 | Kennedy |
| 2004/0032493 A1 | 2/2004 | Franke et al. |
| 2004/0075547 A1 | 4/2004 | Voijtech et al. |
| 2004/0119591 A1 | 6/2004 | Peeters |
| 2004/0190767 A1 | 9/2004 | Tedesco et al. |
| 2004/0246127 A1 | 12/2004 | Junqua |
| 2004/0253926 A1 | 12/2004 | Gross |
| 2005/0104773 A1 | 5/2005 | Clarke et al. |
| 2005/0119584 A1 | 6/2005 | Carter |
| 2005/0123172 A1 | 6/2005 | Henson |
| 2005/0146609 A1 | 7/2005 | Creamer et al. |
| 2005/0146610 A1 | 7/2005 | Creamer et al. |
| 2005/0149979 A1 | 7/2005 | Creamer et al. |
| 2005/0152375 A1 | 7/2005 | An et al. |
| 2005/0181762 A1 | 8/2005 | Kauppila |
| 2005/0186954 A1 * | 8/2005 | Kenney ..................... 455/420 |
| 2005/0225635 A1 | 10/2005 | Meitzler et al. |
| 2005/0248444 A1 | 11/2005 | Joao |
| 2006/0000971 A1 | 1/2006 | Jones et al. |
| 2006/0022829 A1 | 2/2006 | Pan |
| 2006/0050150 A1 | 3/2006 | Yamane |
| 2006/0063523 A1 * | 3/2006 | McFarland ................ 455/423 |
| 2006/0064384 A1 | 3/2006 | Mehrotra et al. |
| 2006/0080541 A1 | 4/2006 | Monaco et al. |
| 2006/0098729 A1 | 5/2006 | Shen |
| 2006/0104444 A1 | 5/2006 | Hampapur et al. |
| 2006/0109113 A1 | 5/2006 | Reyes et al. |
| 2006/0253885 A1 | 11/2006 | Murphy et al. |
| 2007/0011722 A1 | 1/2007 | Hoffman et al. |
| 2007/0013513 A1 | 1/2007 | Tang et al. |
| 2007/0040672 A1 | 2/2007 | Chinigo |
| 2007/0094491 A1 | 4/2007 | Teo et al. |
| 2007/0205876 A1 | 9/2007 | Nguyen |
| 2007/0207750 A1 * | 9/2007 | Brown et al. ............. 455/127.5 |
| 2008/0198159 A1 | 8/2008 | Liu et al. |
| 2008/0201780 A1 | 8/2008 | Khan et al. |

FOREIGN PATENT DOCUMENTS

| | | |
|---|---|---|
| GB | 02384933 A1 | 8/2003 |
| GB | 02393343 A1 | 3/2004 |
| KR | 1020030052511 A | 6/2003 |
| WO | 9501041 A1 | 1/1995 |
| WO | 0117247 A1 | 3/2001 |
| WO | 0156294 A1 | 8/2001 |
| WO | 03041026 A1 | 5/2003 |
| WO | 2004030512 A2 | 4/2004 |
| WO | 2004077308 A1 | 9/2004 |
| WO | 2004095386 A1 | 11/2004 |

* cited by examiner

Fig. 7

MOBILE WIRELESS DEVICE WITH LOCATION-DEPENDENT CAPABILITY

RELATED APPLICATIONS

This application is a continuation-in-part application of U.S. patent application Ser. No. 11/717,806 filed Mar. 14, 2007 titled "Selectively Enabled Threat Based Information System," now U.S. Pat. No. 8,749,343, issued Jun. 10, 2014. The present application also claims the benefit under 35 U.S.C §119(e) of U.S. Provisional Patent Application No. 61/014,509 filed Dec. 18, 2007 titled "Privacy Ensuring Camera Enclosure." The aforementioned applications are incorporated herein by reference in their entireties.

TECHNICAL FIELD

The present exemplary system and method relate to surveillance, monitoring, and security devices. More particularly, the present exemplary system and method relate to mobile transmitters used to control security system interfaces particularly in the event of high-risk situations.

BACKGROUND

Network security systems continually monitor and manage traffic on a network in order to protect information on the network and to prevent unwanted traffic from entering or otherwise using the network. Network security systems also manage traffic in order to improve efficiency of the network. These systems employ firewalls, proxies, antivirus software, data encryption, intrusion prevention systems, and other devices and methods to manage and control network traffic.

General facility surveillance and other monitoring devices are often desirable to prevent criminal and otherwise undesirable activity as well as provide safety and security for those within the facility. Privacy sensitive areas often preclude complete monitoring of a facility. Areas such as restrooms, changing rooms, and even classrooms have certain privacy expectations associated with them that make permanent monitoring of activities inappropriate. However, when high-risk situations such as shootings, hostage situations, or natural disasters occur, an individual's right to privacy may be superseded by a need for surveillance. Additionally, there may be situations where selective activation of surveillance equipment or other systems may be appropriate for safety or convenience reasons, such as when a teacher or employee is alone after hours. However, the use of ever-improving security and surveillance devices is tempered by the desire to protect individuals' rights of privacy.

Surveillance or monitoring apparatuses often include video cameras allowing surveillance images to be viewed and/or recorded at a remote location. For example, an industrial plant, a public school, or a medical facility may have several video cameras at various locations throughout the building and grounds, each camera being communicatively coupled to one or more video screens and/or recorders at central security stations.

Video cameras are also coupled to computers hosting any number of software programs capable of converting video images received from the video cameras into a digital format. Such digital video recordings are particularly useful because they can be digitally transmitted over an Internet or intranet and stored as necessary. Furthermore, personal communication devices such as cellular phones, pagers, and personal digital assistants (PDAs) are becoming increasingly popular commercial products. As wireless communication technology becomes widespread and affordable, wireless communication is nearly ubiquitous. In fact, a number of cellular phones are capable of both sending and receiving video images as well as digital photographs. Consequently, it is possible to transmit surveillance images and videos from a video camera to a remote personal communication device, such as a cell phone or other mobile device.

The technology allowing video streams to be produced and received by mobile devices opens up new possibilities for surveillance and monitoring services. When high-risk situations occur, traditional monitoring systems do not provide a convenient way for the owner or authorities to monitor previously restricted locations.

In sum, corporations, public facilities, schools, and nearly every commercial building utilizes a security system in one form or another. Often the security system includes network and communication security as well as physical facility security. Physical security utilizes motion detectors, cameras, and automatic door locks. However, traditional security systems fail to fully utilize current wireless technology.

SUMMARY

According to one exemplary embodiment, a centralized surveillance and monitoring system is communicatively connected to various monitoring devices such as video and audio recorders. The centralized surveillance and monitoring system is configured to receive, either automatically or manually, a threat-level status. According to one exemplary embodiment, depending on the current threat level, the centralized surveillance system will activate specific cameras or other monitoring devices that are usually inactive to protect privacy concerns. Specific application for privacy sensitive areas such as restrooms and locker rooms is provided for. Furthermore, according to one exemplary embodiment, the centralized surveillance system also monitors and controls network and communication traffic. Where the monitored and controlled communication traffic may include, but is not limited to, cell phones, cell phone repeaters, landlines, fixed phone lines, and VoIP phones.

One exemplary embodiment of a security system for a network and physical facility includes an interface configured to respond to a received threat level, and a computing module configured to determine whether the received threat level exceeds a threshold value assigned to each portion of the security system. That is, at a certain threat level, portions of the security system will activate and others will remain inactive. As the threat level increases, heightened security measures will be taken.

According to one exemplary embodiment, a mobile transmitter device is configured to transmit a wireless signal to a remote device that provides control of area-specific monitoring and security devices. Furthermore, according to one exemplary embodiment, the control and activation of monitoring and security devices may depend on a location of the mobile transmitter and information transmitted. According to various exemplary embodiments the mobile transmitter may comprise of a key fob, PDA, cell phone, radio transmitter, RFID tag, or other devices capable of wireless communication. Also, similar control and activation of monitoring devices may be performed through fixed devices, such as panic buttons and wall mounted control panels. According to one exemplary embodiment, the network and facility security system may be controlled remotely via an Internet or intranet connection.

Furthermore, the present system and method includes, according to one exemplary embodiment, a program allowing a user to group monitoring devices, assign priority levels, and generally manage a wide variety of security and convenience devices. The program, according to various embodiments is configured to control many devices, including, but not limited to, lights, door locks, windows, cameras, video recorders, audio recorders, motion sensors, heat sensors, visual analytic devices, smoke and other foreign substance detectors, and any other sensor useful for convenience or security. Additionally, the system and method may monitor the location of a mobile transmitter within a facility, receive a wireless signal from the mobile transmitter, and provide control of specific portions of the system based on the location and information transmitted.

Likewise, according to one exemplary embodiment, the centralized security system maintains complete control of all aspects of the network and other communication to and from the facility.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of and distances between elements as drawn, are not intended to convey any information regarding the actual shape of the particular elements, and have been solely selected for ease of recognition in the drawings.

DETAILED DESCRIPTION

An exemplary system and method for securing a network and physical facility in response to a perceived threat is described herein. More specifically, an exemplary security system includes an interface configured to respond to a received threat level and modify permissions, bandwidth, or other aspects of the network, limit communication to and from the facility, and control physical surveillance and monitoring devices of the facility and grounds. In conjunction with the network security system, a method is disclosed for modifying certain aspects of the network upon a determination that a threat level exceeds a predetermined threshold value. Additionally, the present exemplary security system includes controlling a monitoring system including surveillance equipment in privacy-sensitive areas. In conjunction with the monitoring system, a method is described for determining which surveillance devices should be activated, based on a privacy threshold value and a perceived threat level.

Moreover, according to one exemplary embodiment, a mobile transmitter is configured to transmit a wireless signal to a remote device, which provides control of one or more surveillance devices depending on a location of the mobile wireless transmitter and the information transmitted from the mobile transmitter. The transmitted information may include a threat level condition for activating surveillance equipment or requests to activate specific systems in a prescribed location while the mobile device is at or near the location. The present specification discloses the components and various exemplary methods for their application and implementation.

As used in this specification and in the appended claims, the term "mobile transmitter" is meant to be understood broadly as any wireless transmitter device that does not directly and physically connect with a phone, internet, or other communication cable. Similarly, as used herein the term "surveillance device" is meant to be understood broadly as including any device used for monitoring one or more people or a space, including, but in no way limited to, image receiving devices such as cameras, audio receiving devices such as microphones, motion detecting devices, and may further include security devices such as door and window locks as well as lighting.

As used in this specification and in the appended claims, the term "network" is meant to be understood broadly as any connection between at least two components such that the components are able to communicate with each other, including electrical communication, wireless communication, or other communication method.

In the following description, for purposes of explanation, numerous specific details are set forth in order to provide a thorough understanding of the present system and method for allowing video and/or audio surveillance systems to provide variable levels of observation proportionate to perceived threat levels. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Network, Communication, and Facility Security Systems

Figure 1:
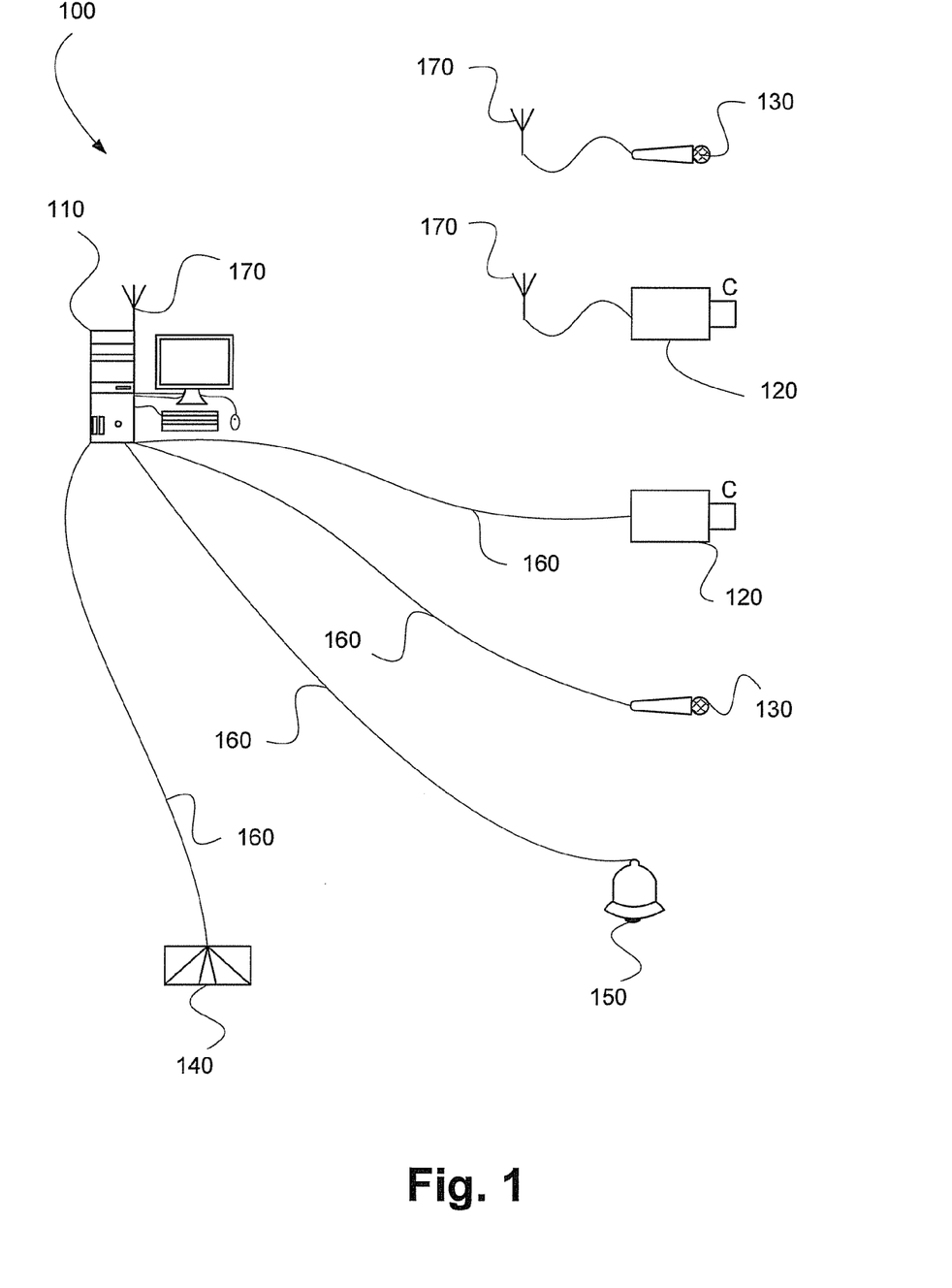
FIG. 1 is a block diagram illustrating a surveillance system, according to one exemplary embodiment.

FIG. 1 illustrates a surveillance system (100) that may be modified to operate according to the present exemplary system and method. Specifically, as illustrated in FIG. 1, a traditional surveillance system (100) may include any number of surveillance components. The exemplary system of FIG. 1 includes a plurality of audio collection devices (130) such as microphones, a plurality of image collection devices (120) such as cameras, one or more motion sensors (140), an audible alarm component (150), and a central monitoring/processing device (110). As illustrated in FIG. 1, the various surveillance components (120-150) may be communicatively coupled to the central monitoring/processing device (110) by either a dedicated hardwire connection (160) or a wireless connection facilitated by any number of wireless transmitters and receivers (170). Additionally, the prior art surveillance system (100) may be communicatively coupled to a standard telephone line or a mobile telecommunications system. According to one exemplary embodiment, the exemplary surveillance system (100) may be configured to effectively monitor a remote area of interest. However, as mentioned previously, prior art surveillance systems are limited by the fact that privacy considerations prohibit monitoring of certain areas, such as bathrooms, dressing rooms, classrooms and other privacy-sensitive areas. Consequently, there is a need for a surveillance system that selectively activates surveillance components in sensitive areas only when a perceived threat level justifies the activation. According to one embodiment of the present system and method, when the benefits of ubiquitous surveillance outweigh individuals' rights to privacy, a centralized system will activate surveillance components in areas not typically monitored.

Figure 2:
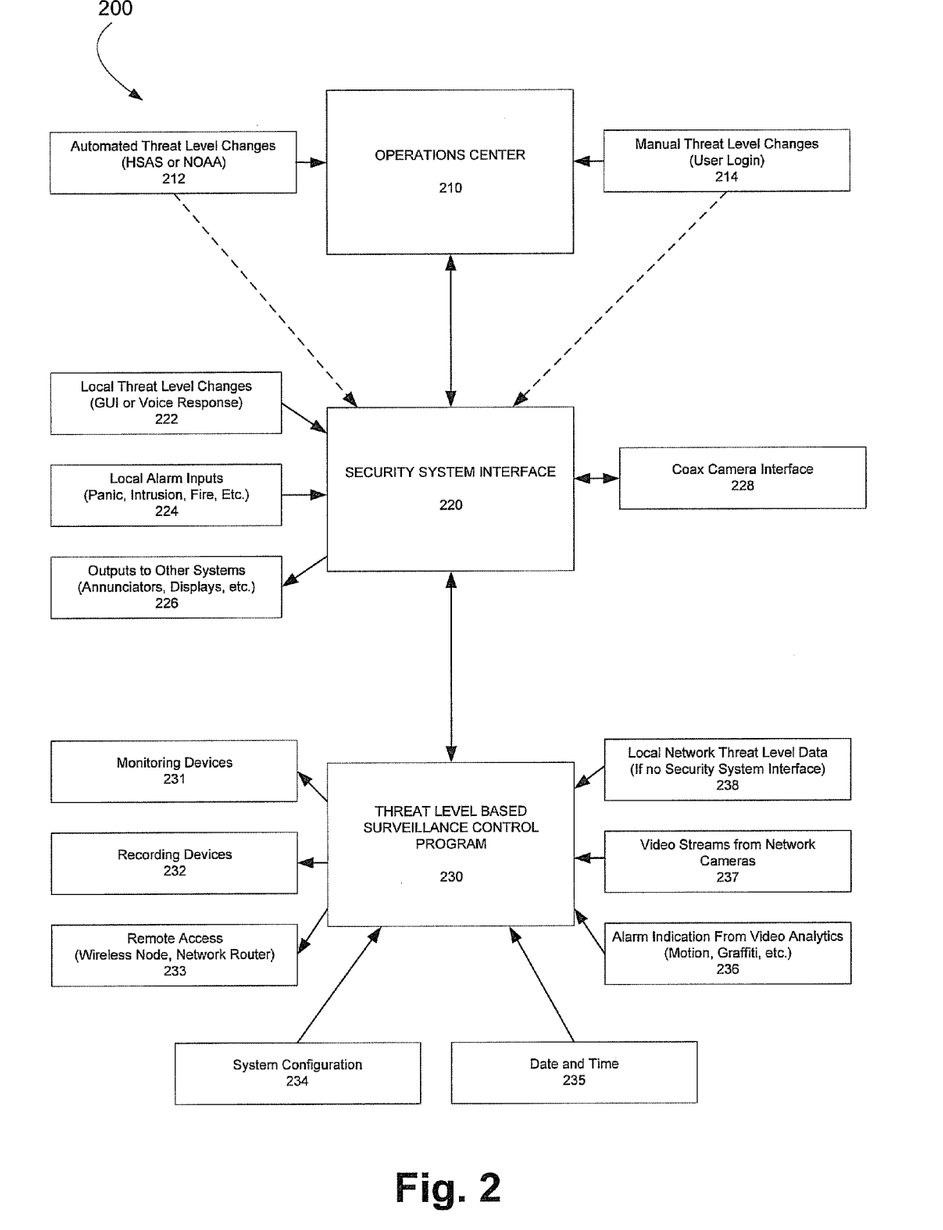
FIG. 2 is a block diagram illustrating the components of a threat based configurable surveillance system, according to one exemplary embodiment.

FIG. 2 illustrates an exemplary threat based surveillance control system (200), according to one exemplary embodiment. The exemplary system is configured to allow video and other surveillance systems to provide variable levels of observation proportionate to perceived threat levels. Specifically, according to one exemplary embodiment, the present threat based surveillance control system (200) is configured to interrupt and automatically regulate a connection between the cameras and other surveillance devices of a surveillance system and the monitoring (231) and recording (232) components. A program (230) within the system (200) determines which surveillance devices are to be connected to any selective number of monitoring devices, such as recorders (232) or monitors (231), under specific threat levels. According to various embodiments, the program (230) is implemented via software, firmware and/or hardware. For example, according to one exemplary embodiment, cameras that were traditionally connected to recording and/or monitoring equipment can be selectively disconnected from the recording and/or monitoring equipment, and thereby made unobserved until perceived threats justify connection of the cameras to the recording and/or monitoring equipment. Permission to activate or reconnect certain cameras to the monitoring equipment is granted based upon changes in threat levels including data automatically provided by any number of sources including, but in no way limited to, Federal, State and Local governments such as the Homeland Security Advisory System for terrorist threats (HSAS) or the National Oceanic & Atmospheric Administration for natural disasters (NOAA). According to the present exemplary system and method, threat level information can be provided to the exemplary threat based surveillance control system (200) through wired and/or wireless connections. Furthermore, a log detailing the individual or event responsible for each identified threat level change is maintained, thereby providing accountability for any increase or decrease in surveillance level. Details of the present exemplary threat based surveillance control system (200) and its operation will be provided below with reference to FIGS. 2-5. The present specification further includes detail about exemplary wireless connections for changing a threat level condition of the surveillance control system.

As illustrated in FIG. 2, the present exemplary threat based surveillance control system (200) can include an operations center (210) communicatively coupled to a security system interface (220) and a threat level based surveillance control program (230). According to one exemplary embodiment illustrated in FIG. 2, the operations center (210) is configured to provide threat level information to the security system interface (220). Specifically, according to one exemplary embodiment, the operations center (210) is communicatively coupled to any number of sources authorized to provide threat based indications including, but in no way limited to, automated threat level sources (212) or manually authorized threat level sources (214). As illustrated, automated threat level sources (212) capable of automatically providing threat based indications may include, but are in no way limited to Federal, State and Local governments such as the Homeland Security Advisory System for terrorist threats (HSAS) or the National Oceanic & Atmospheric Administration for natural disasters (NOAA). Further, manually authorized threat level sources (214) may include, but are in no way limited to supervisors, principals, or other supervisory personnel having an authorized user login. The operations center (210) may be an external "manned" service dedicated to monitoring perceived conditions for a number of clients, or, alternatively, the operations center (210) may be an individual component of the threat based surveillance control system (200).

According to the present exemplary system and method, the operations center (210) may receive and determine a threat based indication via any number of communication interfaces including, but in no way limited to, local wired and/or wireless connections such as computers including desktops, laptops, tablets, handhelds or personal digital assistants (PDAs); panic buttons which may enable predefined functions such as recording, activating an alarm and displaying the appropriate video on a monitor; external transmitters such as activation of a "Police Department" or "Fire Department" transmitter during an emergency response; a voice response system which allows access using devices such as wired, wireless, cellular or Voice over Internet Protocol (VoIP) phones; internet connections which allow broadband connection to connect to the system from a remote location; a dial-up connection which allows a low speed data connection to be utilized to connect to the system from a remote location and/or a wireless (cellular/radio) interface configured to provide an alternate remote connection should telephone lines and/or internet connections be unavailable. According to one exemplary embodiment, the above-mentioned communication interfaces may be used to communicatively couple the threat level sources (212, 214) with the operations center (210) and to communicatively couple the operations center with the security system interface (220).

Figure 3:
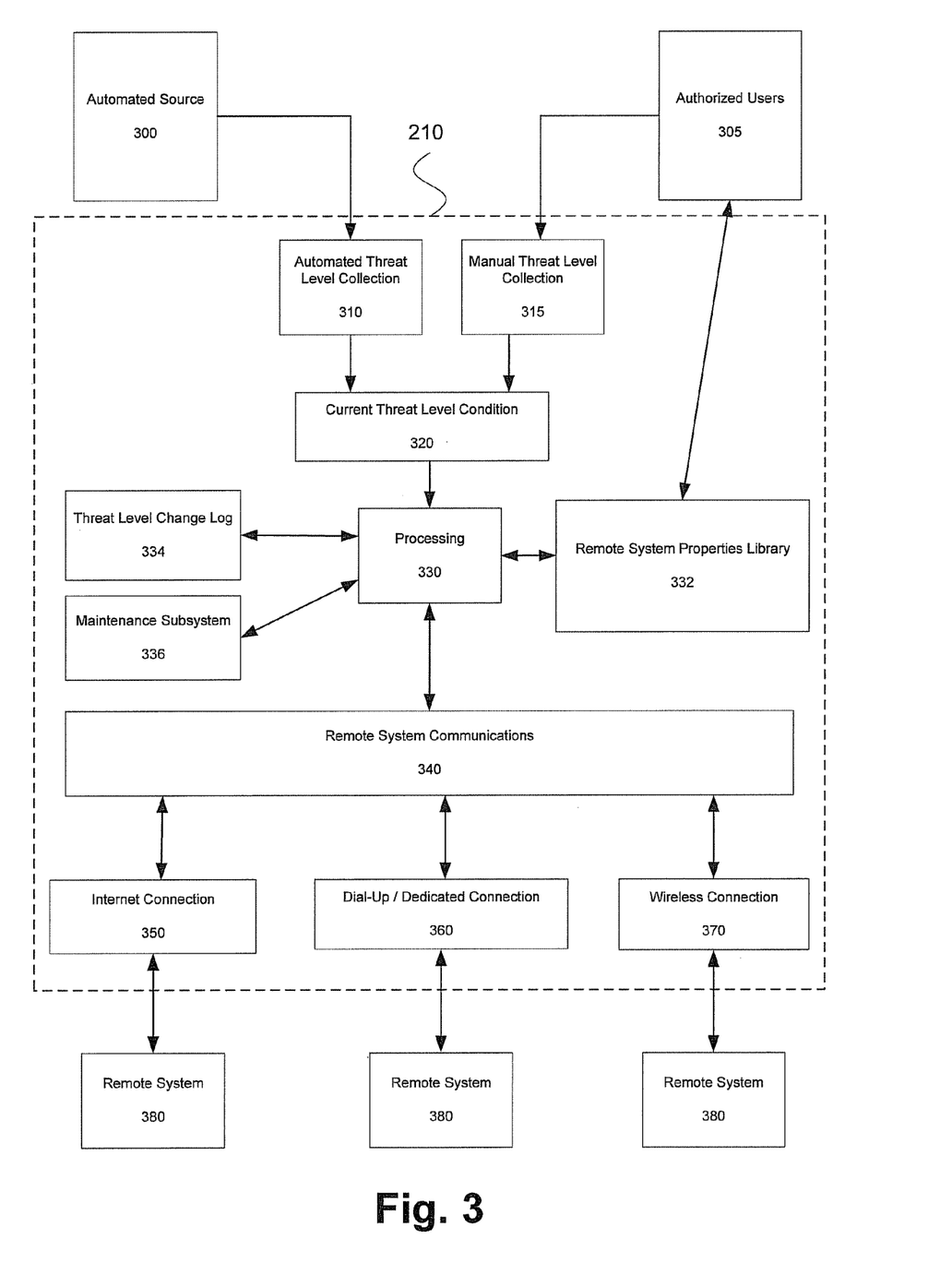
FIG. 3 is a block diagram illustrating the operational configuration and interaction of an operations center, according to one exemplary embodiment.

FIG. 3 illustrates an exemplary operational configuration and interaction of an operations center (210), according to one exemplary embodiment. As illustrated in FIG. 3, threat information may be received from a national automated source (300) or by authorized users (305) and may be received by an automated threat level collection module (310) or a manual threat level collection module (315). Additionally, threat information may be transmitted to a remote system properties library (332) for future processing. The received threat information is collected to establish a current threat level condition (320). The current threat level condition (320) is then processed (330) by the operations center and may assign a quantitative value to the threat level. Once existing threat levels have been determined, the threat levels and the surrounding circumstances can be stored in a threat level change log 334) for future analysis. Additionally, the change in threat levels is also transmitted to the maintenance subsystem (336). According to one exemplary embodiment, the maintenance subsystem (336) is configured to supervise the condition of remote systems such that if an equipment failure occurs, the maintenance subsystem (336) alerts the operations center (210) so that a notice may be relayed to an appropriate system administrator. By providing the maintenance subsystem (336) with changes in threat levels, the maintenance subsystem may actively supervise all of the components in use during an identified threat level.

With the threat level determined, it is then transmitted to the remote system communications portion (340) of the operations center (210). The communications portion (340) of the operations center (210) can then transmit the determined threat level to any number of remote systems (380) via various communication mediums including, but in no way limited to, an internet connection (350), a dial-up or dedicated connection, or a wireless connection (370).

Returning again to FIG. 2, when the operations center (210) receives a threat level indication, the threat level indication is then communicated to the surveillance system interface (220) to be used in connection with and according to the threat level based surveillance control program (230). According to one exemplary embodiment, the security system interface (220) can include a hardware component configured to receive the threat level information. As mentioned previously, the threat level information can be provided to the security system interface (220) in numerous ways, such as from the operations center (210) via an internet connection, through a dial-up connection or wirelessly (i.e. radio interface). Threat level information can additionally be provided to the security system interface (220) locally through wired and/or wireless connections, a voice response system or via the Internet. As illustrated in FIG. 2, the local communication of threat level information may be provided by local threat level changes (222) as input by a graphical user interface (GUI) or voice command, or as triggered by a direct local alarm input (224), as generated by a the triggering of a panic button, intrusion sensor (i.e. motion detection, glass breakage, forced entry, etc.), fire alarm (heat/smoke/fire detection, pull boxes), power failure indicator, and/or environmental sensors (i.e. water, humidity, temperature, vibration, or presence of a foreign substance).

In addition to receiving the threat level information, the security system interface (220) also provides inputs and outputs that can be used for connection to devices such as alarm contacts as well as for interfacing to other equipment for management, supervisory, and/or control purposes. Additionally, when required by legacy systems (i.e. coax based systems) any coax video stream interface components (228) used for controlling a legacy video stream can be incorporated into the security system interface (220).

According to one exemplary embodiment, the security system interface (220) is also configured to communicate threat level information, such as threat levels, source and time of threat level change, etc., to external sources (226). According to one exemplary embodiment illustrated in FIG. 2, the threat level may be provided to external sources by standalone alphanumeric displays, as a status indication on local computing devices such as PDAs and laptops, or as a text message to wireless devices (phones, pagers, etc.) of previously identified personnel such as police.

Furthermore, according to one exemplary embodiment, the security system interface (220) may be configured to provide outputs (analog, digital & I.P.) to control external devices in response to changes in threat levels. According to one exemplary embodiment, the security system interface (220) may be configured to control external alarm systems to initiate police or security response, limit or grant access to doors by controlling the locks, control building management systems such as lighting control (i.e. intelligent video detecting motion could leave lights on after hours while personnel are present), and/or communicate through public address systems by playing pre-recorded messages in response to changes in threat levels. Additionally, according to one exemplary embodiment, the surveillance system interface may also provide supervision of co-located systems including, but in no way limited to, UPS battery monitoring, equipment maintenance alarms (i.e. failure, high temperature), and unauthorized equipment access/tamper alarms.

Continuing with FIG. 2, the security system interface (220) is controlled by, or is communicatively linked to a computing device running a threat level based surveillance control program (230). According to one exemplary embodiment, the threat level based surveillance control program (230) is user configured with a rule set defining the permitted surveillance level of each camera and/or surveillance device under each specific threat level and then controls the system functionality appropriately based upon the current threat level communicated by the security system interface (220), or if a security system interface is not present, by local network threat level data (238). In one exemplary embodiment, depending upon the functionality desired, all or a portion of the threat level based surveillance control program (230) can be incorporated directly into the surveillance system components (i.e. network cameras, digital video recorders or intelligent video devices) while for other systems (i.e., legacy "coax" or systems requiring enhanced functionality) the threat level based surveillance control program (230) may be provided entirely in an external unit such as the security system interface (220).

According to one exemplary embodiment, the threat level based surveillance control program (230) includes a customizable user interface for each type of environment (i.e. schools, retail location, industrial location) that controls the features of the surveillance system (200), such as the recording, monitoring or analysis of camera imagery, based upon specific threat levels.

According to another exemplary embodiment, the threat level based surveillance control program (230) provides a single, straightforward, intuitive interface to features of system components even in multi-vendor or multi-technology systems. Specifically, the interface generated by the threat level based surveillance control program (230) may be user specific, or in other words, specially designed for each user. According to this exemplary embodiment, authorized users only requiring limited access to make threat level changes are presented a simple and streamlined screen that only displays the limited options available to the user. In contrast, administrators can be provided a more complex screen allowing them to perform system configurations (234), modify system date and time (235), and the like.

According to one exemplary embodiment, the threat level based surveillance control program (230) is configured to identify and coordinate system features. For example, according to one exemplary embodiment, the threat level based surveillance control program (230) is configured to coordinate on-site monitoring devices, allowing logical names to be assigned to groups or individual monitoring devices (i.e. "Security—Main Entrance", "Security—Roaming PDA", "Main Office", "Police—Wireless Devices", etc.). Additionally, the threat level based surveillance control program (230) may monitor and adjust on-site recording quality (resolution, frame rate & storage time) depending on the threat level. Furthermore, control of known technologies may be incorporated into the threat level based surveillance control program (230) including, but in no way limited to, remote access and monitoring and use of intelligent video devices using sophisticated threat identification processes such as graffiti detection from video analytics (236).

According to one exemplary embodiment, the threat level based surveillance control program (230) allows an administrator to form logical and meaningful surveillance areas or groups and assign each group or area with a sensitivity designator. According to this exemplary embodiment, monitored locations having similar sensitivities to privacy may be grouped and named. For example, high privacy areas such as restrooms, locker rooms, and changing rooms may be grouped. Similarly, non-sensitive areas such as hallways, student parking lots, cafeterias, and libraries may be grouped and assigned a lower sensitivity designator. During operation, the threat level based surveillance control program (230) may then correlate the assigned sensitivity designator with a received threat level to determine whether monitoring of the grouped areas is justified and/or to provide treatment to received video streams from the network cameras (237).

Additionally, the treatment of various areas by the threat level based surveillance control program (230) may be modified based on a custom calendar. According to one exemplary embodiment, the sensitivity designator of the various grouped areas may be modified based on a predetermined event such as nighttime, weekends, holidays, sporting events, and the like.

Furthermore, the present threat level based surveillance control program (230) receives information from the security system interface (220) and evaluates the received information to define a one-time event such as a change in threat level due to intrusion detection, a fire alarm, or a wireless radio interface such as from police transmitters or panic transmitters. According to one exemplary embodiment, when a one-time event is detected due to an alarm indication (236) or as received from the security system interface (220), data corresponding to the change in threat level is recorded on an electronic memory device. By recording any change in threat level, a history of each threat level status change is created that is traceable to an individual user or specific event. In addition to recording changes in threat levels, data may be uploaded to the operations center (210) for maintenance and to provide a secondary storage site for the threat level change data.

As illustrated in FIG. 2, the threat level based surveillance control program (230) provides the functionality of the present exemplary threat based surveillance control system (200). As shown, the threat level based surveillance control program (230) is communicatively coupled to the monitoring devices (231), the recording devices (232), and any remote access device such as a router or the like (233). Consequently, the threat level based surveillance control program (230) generates the user interface viewed by anyone monitoring the system. Additionally, according to one exemplary embodiment, the threat level based surveillance control program (230) manages, accesses, and executes the third party equipment protocols, voice response system/communications/security protocols, maintenance and software upgrades, and logging system used for efficient use of the present exemplary system.

Figure 4:
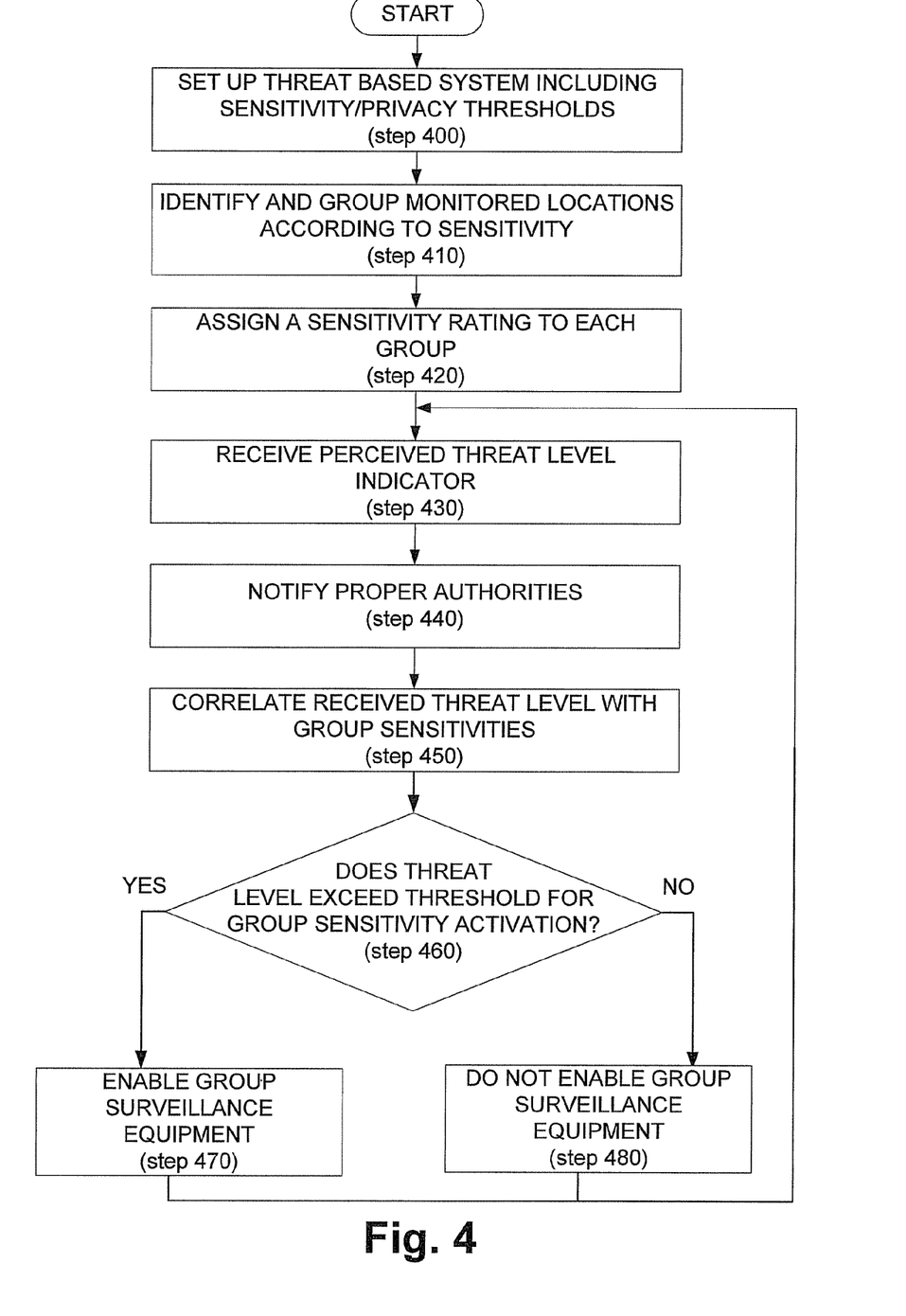
FIG. 4 is a flow chart illustrating a method for selectively configuring a surveillance system in response to a perceived threat level, according to one exemplary embodiment.

FIG. 4 illustrates an exemplary method of operation of the present exemplary threat based surveillance control system (200), according to one exemplary embodiment. As illustrated in FIG. 4, initially setting up the threat based security system including establishing sensitivity and threat thresholds (step 400). According to one exemplary embodiment, during setup of the system (200), conditions and designators are established for areas of privacy sensitivity. Additionally, privacy thresholds indicating when a threat is severe enough to justify surveillance of the designated areas are established. According to one exemplary embodiment, the privacy threshold values are assigned after considering expected privacy associated with each designated area. For example, a privacy threshold value associated with a locker room or restroom would be significantly larger than a privacy threshold value associated with a hallway, a commons area, or other public area. Consequently, it will take a larger threat to justify the activation of surveillance equipment within highly sensitive areas. According to one exemplary embodiment, the privacy threshold and the threat levels are each assigned numeric values corresponding in degree with both the desirability of privacy and the severity of the threat.

With the system (200) setup and the thresholds established, the monitored locations are identified and grouped according to sensitivity (step 410). According to one exemplary embodiment, the monitored locations are grouped and identified with a sensitivity designator (step 420) such that areas of similar sensitivity will be treated the same depending on perceived threats. Alternatively, each and every location being monitored may have an independent sensitivity designator.

With every designation assigned, the system (200) is ready to receive perceived threat level indicators (step 430). As mentioned previously, the threat level indicators may be received by the system (200) from a number of sources including, but in no way limited to an operations center (210; FIG. 2) or local alarm inputs (224; FIG. 2). Once the perceived threat level indicator is received (step 430), the threat level is evaluated and the proper authorities are notified (step 440) if necessary.

The received threat levels are then correlated with the established group sensitivities and privacy thresholds (step 450) for each monitored location. During correlation, the perceived threat level is compared to the privacy thresholds established for each group based on their sensitivities (step 460). According to one exemplary embodiment, if the threat level exceeds the predetermined threshold established for a particular group (YES, step 460), the surveillance equipment associated with the identified group is activated and the devices associated with the locations are enabled (step 470).

If, however, the perceived threat level does not exceed the threshold for an identified group (NO, step 460), the surveillance equipment associated with the group's areas is not activated (step 480). According to this exemplary embodiment, the system continues monitoring and collecting surveillance data on the identified group until another perceived threat level indicator is received (step 430).

Figure 5:
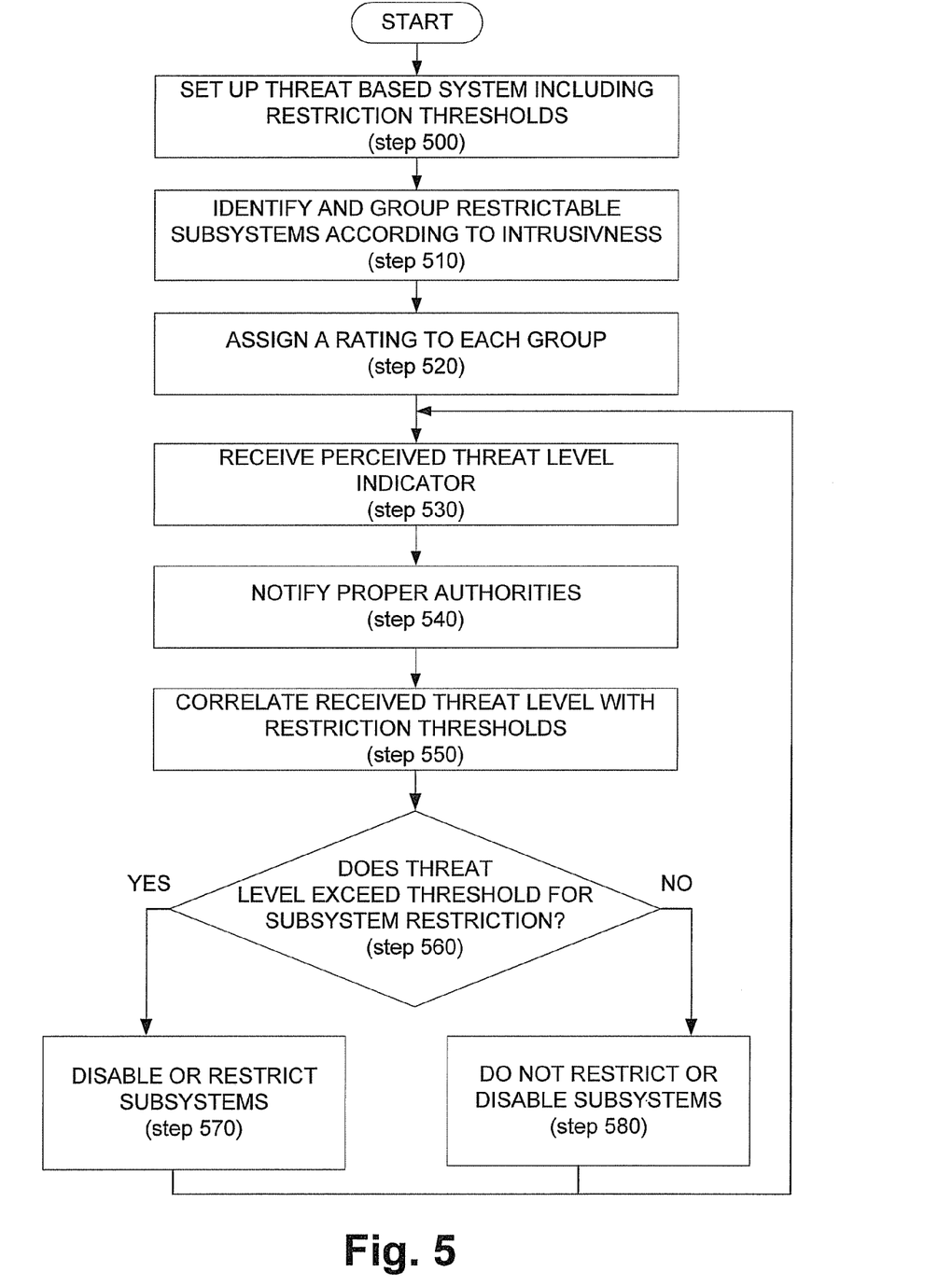
FIG. 5 is a flow chart illustrating a method for controlling all communication in and out of a facility when necessary, according to one exemplary embodiment.

FIG. 5 illustrates an exemplary method of operation of the present exemplary threat based surveillance control system (200), according to one exemplary embodiment. FIG. 5 particularly relates to the response the system will have on network security as well as control of communication to and from the facility. As illustrated in FIG. 5, initially setting up the threat based security system including establishing restriction thresholds (step 500). According to one exemplary embodiment, during setup of the system (200), conditions and designators are established regarding at what threat levels each of the various components of the network and communication infrastructure will be restricted. For example, a minor threat level may not justify a cell phone jammer being activated to prevent cell phones from communication with the outside world. However, in a hostage situation, it may be desirable that a cell phone jammer be activated. Likewise, in the event of hackers or other malicious attacks on the communication infrastructure, the system threat level may be sufficient to limit bandwidth of certain file types, but probably not sufficient to restrict all outgoing phone calls. Consequently, it will take a larger threat to justify the restriction of certain network and communication devices than other less intrusive restrictions. According to one exemplary embodiment, the restriction threshold of each subsystem and the threat levels are assigned numeric values corresponding in degree with both the desirability of protection and the severity of the threat.

With the system (200) setup and the thresholds established, restrictable subsystems are identified and grouped according to intrusiveness (step 510). Subsequently, each grouped subsystem is assigned a rating (step 520). According to one exemplary embodiment, depending on perceived threats some network and communication features will be disabled while others continue to function.

At all other times the system (200) is ready to receive perceived threat level indicators (step 530). As mentioned previously, the threat level indicators may be received by the system (200) from a number of sources including, but in no way limited to an operations center (210; FIG. 2) or local alarm inputs (224; FIG. 2). Once the perceived threat level indicator is received (step 530), the threat level is evaluated and the proper authorities are notified (step 540) if necessary.

The received threat levels are then correlated with the established restriction thresholds (step 550) for each subsystem. During correlation, the perceived threat level is compared to the restriction thresholds established for each subsystem (step 560). According to one exemplary embodiment, if the threat level exceeds the predetermined threshold established for a particular subsystem (YES, step 560), the network or communication devices associated with the subsystem are deactivated or restricted (step 570). If, however, the perceived threat level does not exceed the threshold for an identified subsystem (NO, step 560), the surveillance equipment associated with the group's areas is not activated (step 580).

It is often desirable to raise a threat level slightly based on the date or the time, such as after work hours. During this slightly raised threat level, several restrictions may be in place. As one example, a corporation may decide to prohibit phone calls after hours to prevent abuse of company phone lines. The system may restrict all outgoing calls except for emergency numbers. As another example, banks, corporations, law firms, healthcare facilities, and other facilities may provide wireless Internet or intranet access (Wi-Fi). After business hours, the system, on a slightly raised threat level, may reduce or entirely restrict the network traffic over such a wireless access point. This would prevent 'parking-lot hackers' from compromising the company's network and private data.

Figure 7:
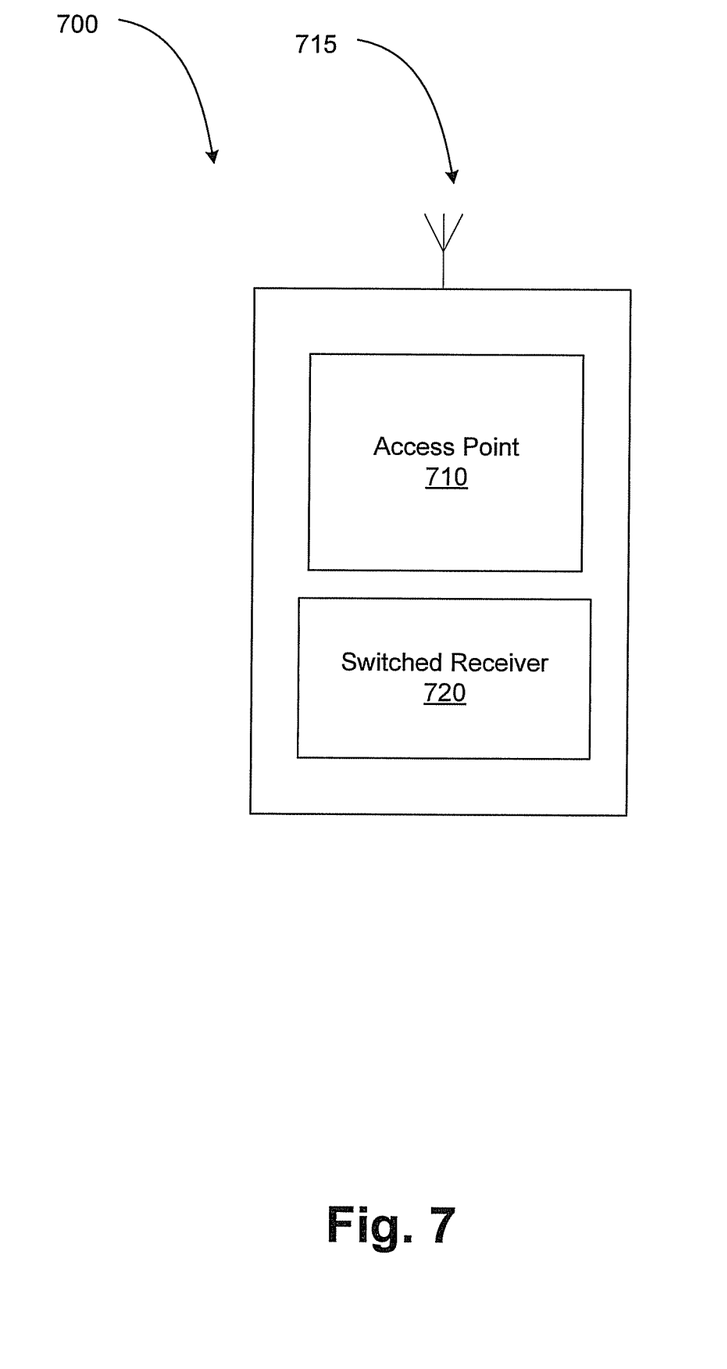
FIG. 7 is a system diagram of a wireless access point configured to be selectively activated, according to one exemplary embodiment.

FIG. 7 illustrates a wireless access point (700), according to one exemplary embodiment. As illustrated, the wireless access point (700) may include, but is in no way limited to, an access point module (710), an antenna (715), and a switched wireless transmitter/receiver (720). For simplicity of explanation, a number of possible components have been eliminated from the illustrated wireless access point (700) including, but in no way limited to, network connections, power supplies, wiring, additional antennas, and the like.

According to one exemplary embodiment, the wireless access point (700) is configured to act as a selectively activated access point that can be activated or deactivated depending on a received threat level or pre-determined date and/or time. For example, according to one exemplary embodiment, the wireless access point (700) is configured to receive, via the antenna (715) and/or wired alarm or network connections (not shown) an indication of threat level. The received signal is sent from the wireless transmitter/receiver (720) to the access point module (710). The access point module is a processor configured to evaluate the received signal and selectively activate the functionality of the wireless transmitter/receiver (720). If the received signal indicates an elevated threat level, or if a pre-determined time or event is satisfied, the transmission capabilities of the wireless transmitter/receiver (710) can be disabled to prevent unauthorized use of the access point. The reception capabilities of the wireless transmitter/receiver (720) are maintained to allow for the selective re-activation of the access point (700) via an activation signal or condition.

Any number of typically 'open' or 'public' network or communication access points such as computers, Internet, Intranet, fax machines, telephones, cell phone repeaters and other devices might be disabled after hours or during time of elevated threat. Alternatively, such subsystems may be significantly restricted, but not entirely disabled, in order to provide a secure network and communication system.

According to one exemplary embodiment, personnel desiring to use network and communication systems after hours or during high threat level crisis may do so with passwords or access cards. According to one exemplary embodiment, the presence of an authorized Mobile Transmitter (discussed below) will automatically allow greater use of network and communication subsystems.

The ability to control the network and communication both to and from the facility during crisis can be extremely useful. For example, during police, fire, or hostage situations it may be desirable to have full access to call into the building and see cameras within the building while completely restricting any communication from within the building. According to one exemplary embodiment, a cell phone jammer may be activated by the security system to prevent outgoing calls and all other outgoing communication is restricted by the security system.

Complete control of the communication subsystems will allow authorities access to the private radios, computers, intercoms, phones and other devices, while those within the facility may be entirely without access to those subsystems.

Mobile Transmitter, Key Fob

Figure 6:
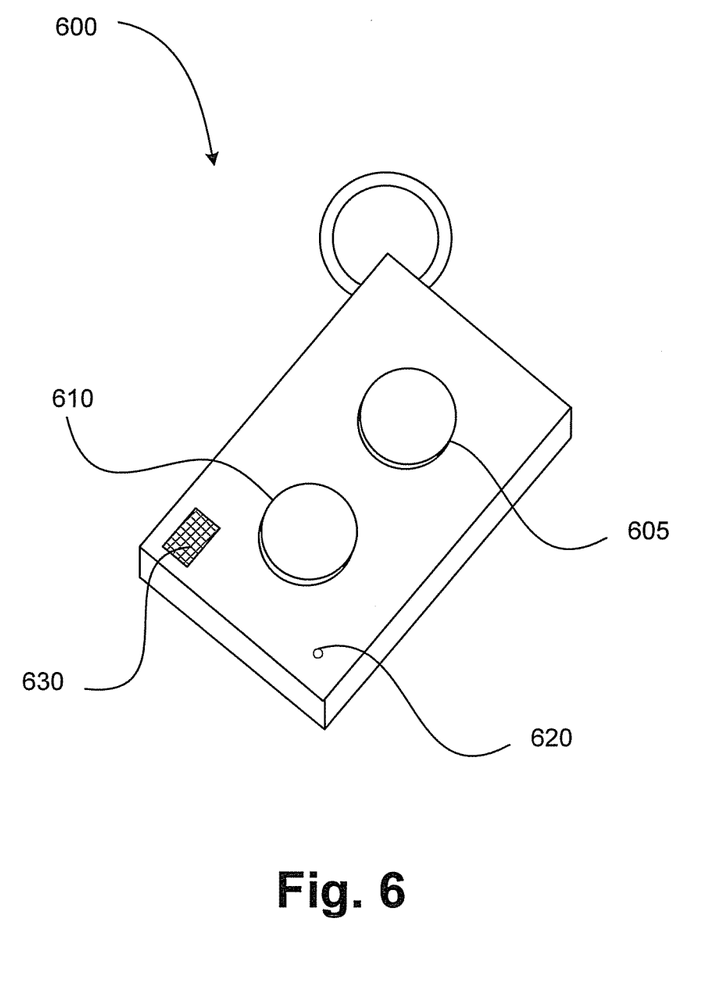
FIG. 6 is a wireless transmitter configured to communicate with a surveillance system, according to one exemplary embodiment.

As previously mentioned, the threat level may be changed through a wireless connection, such as from a panic transmitter. An exemplary panic transmitter for the system and method of the present specification includes a key fob transmitter (600, FIG. 6) configured to send a wireless signal to the security system interface. FIG. 6 illustrates an exemplary embodiment of a key fob configured to communicate with the security system interface. The key fob transmitter (600) may be able to attach to a key chain or otherwise retained in a person's possession such that the person may carry the key fob transmitter (600) with him or her at all times while on the premises. For example, each teacher at a school may have a key fob transmitter (600) with a panic button (605). In the event of an emergency, a teacher may press the panic button (605) to send a signal to the security system interface (220) or another remote device connected to the security system interface. Pressing the panic button (605) sends a new threat level condition to the security system interface in order to activate surveillance equipment or to send messages to law enforcement, a fire department, or other emergency responders, if so desired. The threat level provided by the transmitter (600) may be limited to the specific room in which the transmitter (500) is located. Thus, only surveillance equipment within the room or immediate area of the room may be activated, without activating any other systems in other areas of the building. The threat level may also be limited in other ways, such as only activating some of the surveillance equipment within the room. In order to prevent accidental activation of the emergency surveillance equipment, the panic button (605) may need to be pressed for a certain amount of time before sending a signal, or the transmitter (600) may include some other accidental activation prevention measure.

The mobile transmitter (600) may also include the capability to activate or deactivate other, non-emergency systems for preventative safety measures or merely for convenience, either automatically or by pressing a second button (610). Such capabilities may include, but are in no way limited to, lighting control, unlocking/locking doors, activating a temperature control system, activating alarm systems, or activating cameras in a classroom for recording presentations, recording after hour activities in a certain area, or the like. A transmitter with the capability to control lighting, for example, allows a person to turn on lights before entering a room or hallway in order to improve visibility and reduce the likelihood of accidents. According to one exemplary embodiment, the transmitter sends a wireless signal to a single operation center that determines the location of the transmitter either through triangulation, RFID tags, transmission proximity detectors, or other methods, so that only systems within a predetermined distance of the transmitter are activated, either automatically or upon pressing of a button. Thus, as a person moves, the systems in the person's previous location deactivate, such as lights turning off and doors locking.

Also, a person may activate certain cameras as they travel from one area to another, so that the cameras monitor the person as he/she moves from room to room. Pressing a separate button on the transmitter may activate each individual system. Alternatively, one button may activate a plurality of systems. The transmitter may also be used to send a message to other personnel within the building to notify that a certain event has occurred, such as sending a page or text to a custodian that a mess needs to be cleaned up.

Another application in which the transmitter may be used includes initializing a radio frequency identification detector (RFID) to take an attendance record based upon the presence of RFID tags in a room, after which the RFID detector may turn off. This application may be useful in circumstances such as classrooms in which students may be issued unique RFID tags that they carry with them to classes in order to facilitate the taking of attendance and create an accurate record, particularly in large classes.

According to one exemplary embodiment, the mobile transmitter of FIG. 6 is configured with multiple buttons. According to one exemplary embodiment, some buttons on the device are configured for non-emergency use and other buttons are exclusively for emergency use. For example, buttons may be configured to control lights, door locks and other non-emergency functions, while a panic button may secure any number of doors, activate monitoring devices or perform other emergency functions associate with the surveillance and monitoring system.

According to one exemplary embodiment, each wireless device is assigned a unique user 10 allowing the surveillance and monitoring system to log which user activated which services. For example, a log of exactly who authorized a raise in threat level would be possible. Furthermore, unique IDs for each of the transmitters would allow lost or stolen devices to be blacklisted or disabled. Also, with unique IDs, certain people may be registered users with more access than others. Guests may be given only the capability to signal an emergency, while administrators may be able to activate surveillance systems without signaling an emergency. According to one exemplary embodiment each wireless device is configured with a unique ID so that when an administrator pushes an emergency button the system will respond differently than when a staff member or guest pushes the button on his or her wireless device. For example, in response to the administrator, the system may begin surveillance and notify authorities, while the system may respond to staff and guest emergencies by notifying the administrator.

Wireless devices may be further modified to include two-way communication. According to one exemplary embodiment, the wireless device is capable of receiving video or audio from the surveillance and monitoring system. One advantage of a wireless device communicatively connected to the surveillance and monitoring service is that areas such as basements would still allow for communication between the wireless devices and the central system. Furthermore, with triangulation methods, location of the transmitter will be known and GPS type services might be provided to either the central system or to the wireless transmitter. According to one exemplary embodiment, the wireless transmitter is capable of receiving directions as a response to a specific emergency. For example, audio alerts, directions, or even navigation out of the building or to a safe place within the building.

Size and shape of the wireless transmitter may vary widely depending on the functionality. Devices allowing only one-way communication via a multiplicity of buttons or sensors may be very small, while devices capable of displaying video or audio may need to be slightly larger. However, it is often desirable to have small transmitters such as a key fob that allow a user to discretely signal an emergency. Even with an extremely small form factor like a key fob it is possible to include minimal two-way communication, such as blinking lights (620) or a tone from a speaker (630). Specifically, an indication that the device is working may be comforting to the person utilizing the device during an emergency. Such notification may be given the user via lights or audio confirmation on the wireless device itself, or alternatively through a public announcement system.

As previously mentioned, according to various embodiments, the mobile transmitter may range from single-button devices to more complex devices capable of two-way communication and/or even video. According to one exemplary embodiment of the surveillance and monitoring system, a wide variety of mobile transmitters are configured to operate in conjunction with the same system. This is particularly useful as it allows visitors or typical employees to have limited access, such as only the ability to signal an emergency, while security personal or administrators may be equipped with more complex fully functional transmitters allowing for complete control of the system.

According to one exemplary embodiment, the mobile transmitter presents a more complex user interface allowing for greater system control, such a device may be similar to or integrated within cell phones or personal digital assistants (PDA). A more complex device allows for more detailed control over the systems in each area, such as the capability to set the temperature, or to raise or lower the volume of a sound system. The more complex wireless device may also connect to a different remote device within each room. For example, according to one exemplary embodiment, a remote device may control only the systems within the room in which it is located. The more complex wireless device may also communicate with the remote device through any wireless connection, such as infrared, Bluetooth, Wi-Fi, or Wi-Max. The complex mobile transmitter (actually a transceiver) may provide for password, voice, or other authentication in order to activate any or all of the systems.

Alternative Embodiments

According to one alternative embodiment, the present exemplary threat based surveillance control system (200) manages commercial and/or government shared wireless systems. For example, in the case of Wi-Fi networks, municipal Wi-Fi (wireless broadband) networks are becoming more and more popular. These networks typically provide a combination of "Public" and "Government" (i.e. Public Safety) usage. As the wireless bandwidth that is available is limited, it needs to be shared and the manner in which it is partitioned might need to be altered in a high threat level situation. The present threat based surveillance control system (200) can modify available bandwidth in high threat situations. Consequently, the present system could be used to automatically increase "Government" bandwidth when required without limiting "public" access during normal operation.

Similarly, the present threat based surveillance control system (200) can be applied to commercial radio systems such as integrated digital enhanced networks (Sprint/Nextel). As wireless radio systems are becoming more complicated and thus more expensive, many critical users (i.e. "utilities" such as gas, water, and electric companies) are switching from private radio systems to commercial ones. As bandwidth on these systems is limited, the present threat based surveillance control system (200) can be applied, according to one exemplary embodiment, to modify available bandwidth in high threat situations, thereby guaranteeing that priority communications are not compromised.

According to a second exemplary embodiment, the teachings of the present threat based surveillance control system (200) can be applied to provide data to manage network security systems. For example, in the case of firewalls, routers, and wireless access points, the level of corporate data network security is typically determined by evaluating the risk to the system and functionality required by the users. Networks that are too secure become more complicated, difficult to use, and less efficient. According to one exemplary embodiment, the present threat based surveillance control system (200) is used to compliment network security systems and automatically adjust the security/functionality balance appropriately under high threat level situations, thereby making systems more secure without impacting performance under normal circumstances. Similarly, for data back-up services, the present threat based surveillance control system (200) can be utilized to add increased functionality to current data protection systems such as automatically performing more frequent or more "off-site" back-ups during elevated threat periods. Additionally, according to one exemplary embodiment, the present threat based surveillance control system (200) may interact with system software to modify safety settings and perform higher security operations. For example, according to one exemplary embodiment, the present threat based surveillance control system (200) may interact with e-mail software to block or strip attachments when an elevated threat level exists.

Blocking or stripping attachments may be useful in preventing computer viruses, worms, and other similar threats from being spread throughout a network if a virus or worm is detected on a machine connected to the network. Attachments may also be blocked to prevent secure data from being disseminated if an initial security breach is detected, such as if an unfamiliar Internet Protocol (IP) address is detected. Similarly, email and other electronic messaging (such as text messaging) capabilities may be monitored and limited in other emergency situations in order to prevent private or threatening data from being sent, or to allow for law enforcement or other emergency personnel to transmit messages to a specific group of users on the network or on multiple networks.

Furthermore, the present threat based surveillance control system (200) may be extended to access control systems and alarm systems. Providing access control systems with threat level information, different rules or access restrictions can be automatically implemented during high threat situations. For example, according to one exemplary embodiment, areas that are normally accessible to "visitors", such as parking structures, could become temporarily restricted during high threat situations. This permits access control systems to allow normal facility access during standard conditions while providing increased protection when needed.

Providing alarm systems with threat level information, different protection levels can be applied automatically during high threat situations. For example, during normal hours when a perimeter alarm system would have been otherwise deactivated, in an elevated threat level situation, special "zoning" can be activated providing protection of secondary entrances and coverage such as glass breakage. Additionally, during natural disasters such as a hurricane the system could monitor damage resulting in open windows or doors. This would allow the alarm system to be more efficient by offering increased functionality.

In conclusion, the present system and method selectively monitors sensitive areas depending on threat levels. More specifically, the present system and method provide variable levels of observation proportionate to the current threat level. A surveillance system interface is configured to selectively activate and deactivate inputs and outputs to surveillance devices based on a received threat level.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A system for controlling a plurality of surveillance, monitoring, and security devices comprising:
   an operations center including a processor and a remote receiving device; and
   at least one mobile transmitter device configured to transmit a wireless signal to said remote receiving device;
   wherein said remote receiving device relays said wireless signal to said processor and said processor activates at least one of a surveillance, monitoring, or security device in response to said wireless signal; and
   wherein said wireless signal comprises a threat level indicator configured to change a threat level status of said system;
   wherein areas of the system containing said at least one of surveillance, monitoring, or security devices are grouped based at least in part on an assigned privacy threshold value for each area of the system;
   wherein said threat level indicator is compared against said privacy threshold value assigned to each area of the system to selectively activate said at least one of surveillance, monitoring, or security devices; and
   wherein said privacy threshold value is assigned to each of said areas of the system upon a determination of a degree of privacy desired in each of said areas of the system containing said at least one of surveillance, monitoring, or security devices in relation to external threats.

2. The system of claim 1, wherein said at least one mobile transmitter device comprises a key fob configured to connect to a key chain;
   wherein said mobile transmitter has a unique ID configured to enable said system to disable said at least one mobile transmitter device when lost or stolen.

3. The system of claim 1, wherein said at least one of surveillance, monitoring, or security devices associated with each of said areas of the system containing at least one of surveillance, monitoring, or security devices are selectively activated upon a determination that said threat level indicator exceeds said privacy threshold value.

4. The system of claim 1, further comprising an operations center at said remote receiving device comprising a default threat level, wherein said at least one of surveillance, monitoring, or security devices are deactivated at said default threat level.

5. The system of claim 1, wherein said at least one of surveillance, monitoring or security devices comprises video equipment, audio equipment, motion detectors, heat, light, and foreign substance detectors, cameras, and locks.

6. The system of claim 1, wherein said system further comprises lighting control in an area in which said mobile transmitter device is located.

7. The system of claim 1, wherein said system further comprises a temperature control system in an area in which said mobile transmitter device is located.

\* \* \* \* \*